United States Patent [19]
Wright

[11] Patent Number: 6,016,986
[45] Date of Patent: Jan. 25, 2000

[54] APPARATUS FOR STRINGING AND RETRIEVING FENCING

[76] Inventor: David M. Wright, 174 Cane Creek Farm Rd., Alexandria, Ala. 36250

[21] Appl. No.: 09/232,586

[22] Filed: Jan. 19, 1999

[51] Int. Cl.[7] .................................................. B65H 23/04
[52] U.S. Cl. .................................. 242/396.9; 242/403.1; 242/423.1
[58] Field of Search ................................. 242/396.9, 403, 242/403.1, 423, 423.1

[56] References Cited

U.S. PATENT DOCUMENTS

| | | | |
|---|---|---|---|
| 443,697 | 12/1890 | Leech | 242/396.9 |
| 639,818 | 12/1899 | Levett | 242/403.1 X |
| 671,248 | 4/1901 | Thomann et al. | 242/403 X |
| 761,283 | 5/1904 | Berthelot | 242/423.1 |
| 1,041,142 | 10/1912 | Moore | 242/403 |
| 1,201,434 | 10/1916 | Bohle | 242/403 |
| 1,302,121 | 4/1919 | Anderson | 242/423.1 X |
| 2,453,979 | 11/1948 | Frontz | 242/396.9 |
| 2,563,377 | 8/1951 | Schmidt | 242/403.1 X |
| 3,243,137 | 3/1966 | Norman | 242/423 X |
| 3,650,492 | 3/1972 | Stum | 242/396.9 X |
| 5,568,900 | 10/1996 | Conroy | 242/403 X |
| 5,584,444 | 12/1996 | Farmer | 242/403 X |

FOREIGN PATENT DOCUMENTS 86071 4/1936 Sweden .................................. 242/403

OTHER PUBLICATIONS

Stafix Elec. Fencing Prod. Cat.
Gallagher Power Fence Cat.
1998 Red Snap'r Catalog.
1993 Premier Fence Systems Cat.
SW Power Fence & Livestock.

*Primary Examiner*—Donald P. Walsh
*Assistant Examiner*—Minh-Chau Pham
*Attorney, Agent, or Firm*—Robert J. Veal; Kenneth M. Bush; Veal & Bush, LLC

[57] ABSTRACT

An electric wire fence stringing and retrieval apparatus uses a carriage which can be pulled behind a vehicle and which supports a spool on which electrical fence wire is stored. The spool has an associated brake which allows wire to be played out as the carriage is moved during a fence stringing operation without the spool over spooling. Likewise, the brake can be disengaged during retrieval. The spool is inertially loaded such that rotation of the spool easily overcomes the weight of the wire during retrieval. A manual level winding unit is provided to allow the user to properly position the wire on the spool. The carriage includes storage for primary and supplemental fence posts and fencing tools which may be needed.

15 Claims, 5 Drawing Sheets

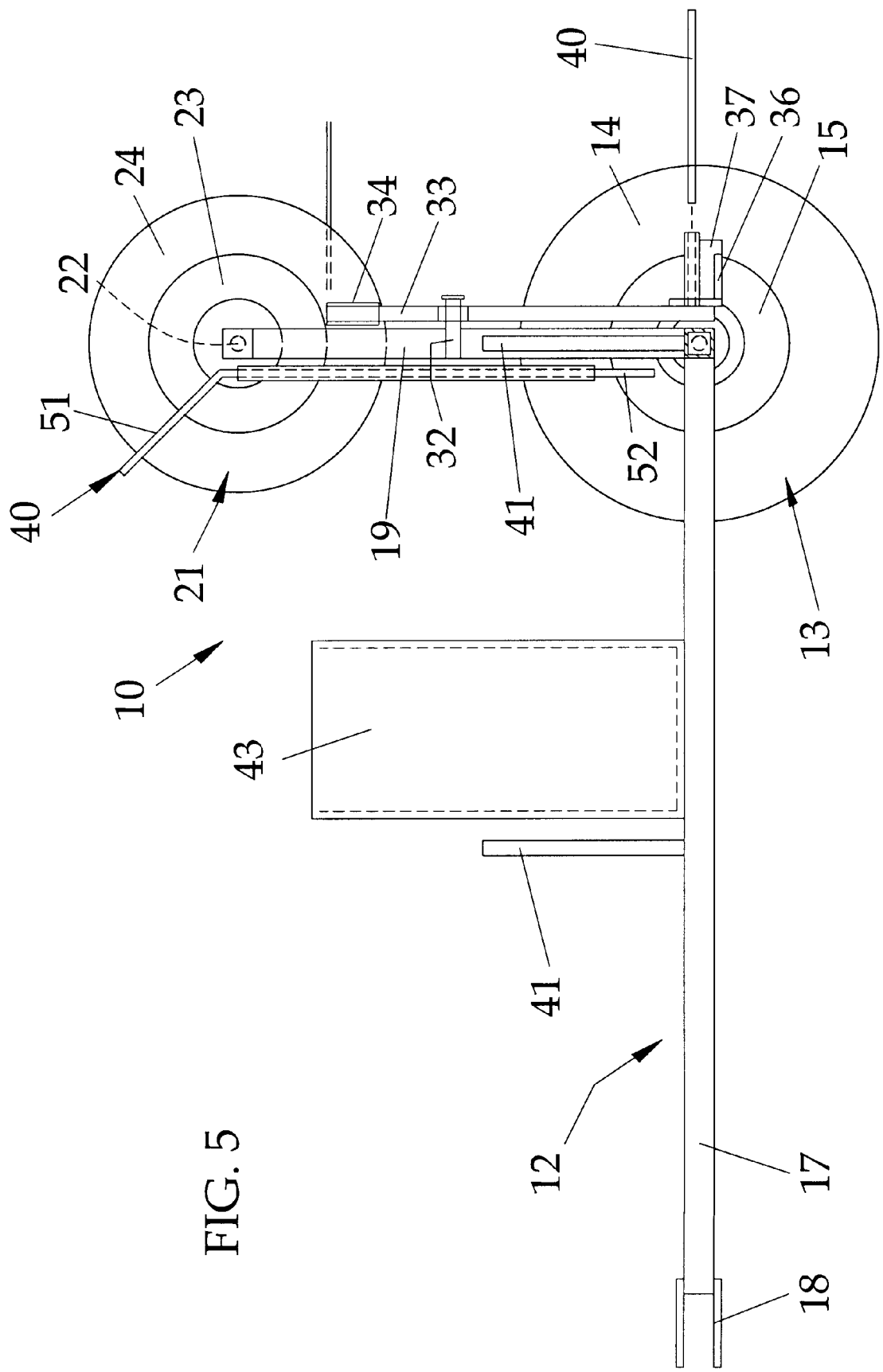

APPARATUS FOR STRINGING AND RETRIEVING FENCING

FIELD OF THE INVENTION

The present invention relates generally to agricultural fencing or fencing for segregating large areas of land for controlled use. More particularly the present invention relates to electrical fencing for such uses. In even greater particularity, the present invention relates to apparatus for stringing and retrieving such electrical fencing. In still further particularity the present invention relates to a carriage mounted dispensing and retrieving system for lightweight polycoated electrical fencing.

BACKGROUND OF THE INVENTION

Various types of wire reel carriers are known in the prior art. A typical example of such a wire reel carrier is to be found in U.S. Pat. No. 3,764,031, which issued to E. Parsen on Oct. 9, 1973. This patent discloses a trailer which may be easily converted to carry various sized cable wheels or small construction equipment such as a trencher. The assembly includes an axle portion with a pair of telescopic rear portions, a telescopic tongue portion for pulling the axle portion and a pair of channel-shaped rails for transporting the equipment. U.S. Pat. No. 3,856,230, which issued to E. Zimmer on Dec. 24, 1974, discloses a wire dispensing hand dolly which includes a pair of spaced frame rails having a series of aligned notches for supporting a plurality of spaced wire roll supporting rods. U.S. Pat. No. 4,042,187, which issued to G. Snyder on Aug. 16, 1977 discloses an apparatus for unreeling wire from cartons or spools from a vehicle mounted support stand that attaches to the bumper of the vehicle. U.S. Pat. No. 4,190,211, which issued to H. Janzen on Feb. 26, 1980, discloses a device for mounting a reel of wire on a truck bed which includes a pair of brackets mountable at opposite sides of the bed and adapted to support an elongated shaft at spaced locations therealong. A friction braking assembly includes a rotatable friction element adapted to be keyed to a reel rotatably supported on the shaft. U.S. Pat. No. 4,339,096, which issued to A. May on Jul. 13, 1982, discloses a cable laying apparatus for use with—agricultural tractors equipped with a rear three-point hydraulically operated hitch. The device includes a supporting frame for lifting, carrying and unwinding heavy spools of barbed wire for laying fences. U.S. Pat. No. 4,437,622, which issued to M. Heider on Mar. 20, 1984, discloses a wire roller which includes a wire receiving spool rotatably supported on a frame adapted for securement on a vehicle. An electric motor supported on the frame includes drive means for rotating the spool. The frame may be secured on a vehicle by a clamping assembly including a pair of co-acting clamp jaws. A torque applicator is operatively associated with one clamp jaw for pivotally moving the clamp jaws clamping engagement on a vehicle bumper. U.S. Pat. No. 4,946,113, which issued to C. Riffle on Aug. 7, 1990, discloses a wire reel carrier for use in stringing barbed wire for fencing, designed for attachment to the cargo rack of an all terrain vehicle. U.S. Pat. No. 5,568,900, issued Oct. 29, 1996 to H. Conroy discloses a draw bar supported apparatus for dispensing strand wire or mesh wire. U.S. Pat. No. 5,584,444 issued to J. Farmer on Dec. 17, 1996, discloses a mounted device for rewinding electric fencing.

Electric fences have been used for many years as barriers for retaining or excluding animals usually in agricultural settings. Typically, electric fences are comprised of a continuous length of electric wire which is mounted via electrical insulators to posts secured in the ground so that the wire encircles a defined area. The electric wire is connected to a low voltage power source, which may be stepped down from line voltage or a battery, and a control box which periodically causes the wire to be energized with electrical current. When the electrical wire is so energized, any animal coming into contact with the energized wire will serve to ground the wire and will thereby receive a painful, although not dangerous shock. After being shocked once or twice, the animals will avoid coming into contact with the wire. Thus, the energized wire becomes a barrier for the animals.

Intensive grazing is a type of grazing practice which is gaining widespread acceptance in the United States. This practice involves frequently moving cattle from one small parcel of property to another. The cattle eat the grass contained in the parcel until there is no grass left and then the herd must be moved to a fresh parcel. Rather than erect a series of traditional crossfences consisting of barbed wire, farmers often prefer to employ more flexible means to retain the herd within a parcel. Electric fences are one preferred option.

One problem associated with use of electric fences is the need to occasionally move the fence. This entails rewinding the electric wire onto some type of spool. Manually holding the spool and rewinding the wire onto the spool by hand is difficult for several reasons. First, as wire is wound onto the spool, the spool becomes progressively heavier and more difficult to hold in a person's hands. Second, with the hands occupied in holding the spool and winding the wire thereon, it is difficult to wind the wire smoothly and tightly around the spool. If the wire is not wound smoothly and tightly onto the spool. the spool will not be able to hold all of the length of wire which was originally contained on the spool. Also, if the wire is not rewound onto the spool in a smooth fashion, the wire can tangle and will be difficult to remove from the spool when needed to build another fence, which will be nearly a contemporaneous event when intensive grazing is practiced. While each of the above described fencing apparatus has been available for some time it is clear, merely from the continued development of the art, that no completely satisfactory apparatus has heretofore been developed that will facilitate rapid deployment and retrieval of electric fences. My apparatus does so.

SUMMARY OF THE INVENTION

It is the object of the present invention to allow an individual farmer to utilize a vehicle such as an ATV or a truck and single handedly string, retrieve, move or relocate electric fencing of the polycoated strand variety over large areas of grazing land to create controlled grazing areas, thereby improving the speed of deployment and retrieval, reducing the cost of labor involved in the operation, and generally improving the efficiency of the fencing process. While numerous other advantages and features are to be realized in the use of the apparatus, they will become evident by such use or the perusal of the attached specification.

The objects are accomplished through the use of a carriage which can be pulled behind a farmers vehicle and on which a wire spool is mounted. In this application, using lightweight polycoated wire, the spool accommodates several thousand feet of wire, such that long expanses of fence may be set. The spool is provided with inertial weighting for retrieval of the wire, such that the farmer does not have to continuously apply force to the spool to wind the wire end. Likewise, a gravity brake is provided to prevent the spool from over running the wire when the wire is being played out to form the fence. The carriage has space thereon for fence posts and intermediate fence posts to be used in forming the fences as well as tools for use in moving the fence.

BRIEF DESCRIPTION OF THE DRAWINGS

Apparatus embodying features of my invention are depicted in the accompanying drawings which form a portion of this disclosure and wherein:

FIG. 1 is a side elevation view of the apparatus and an ATV that it may be used with;

FIG. 5 is side elevation view of the apparatus;

DESCRIPTION OF A PREFERRED EMBODIMENT

Figure 1:
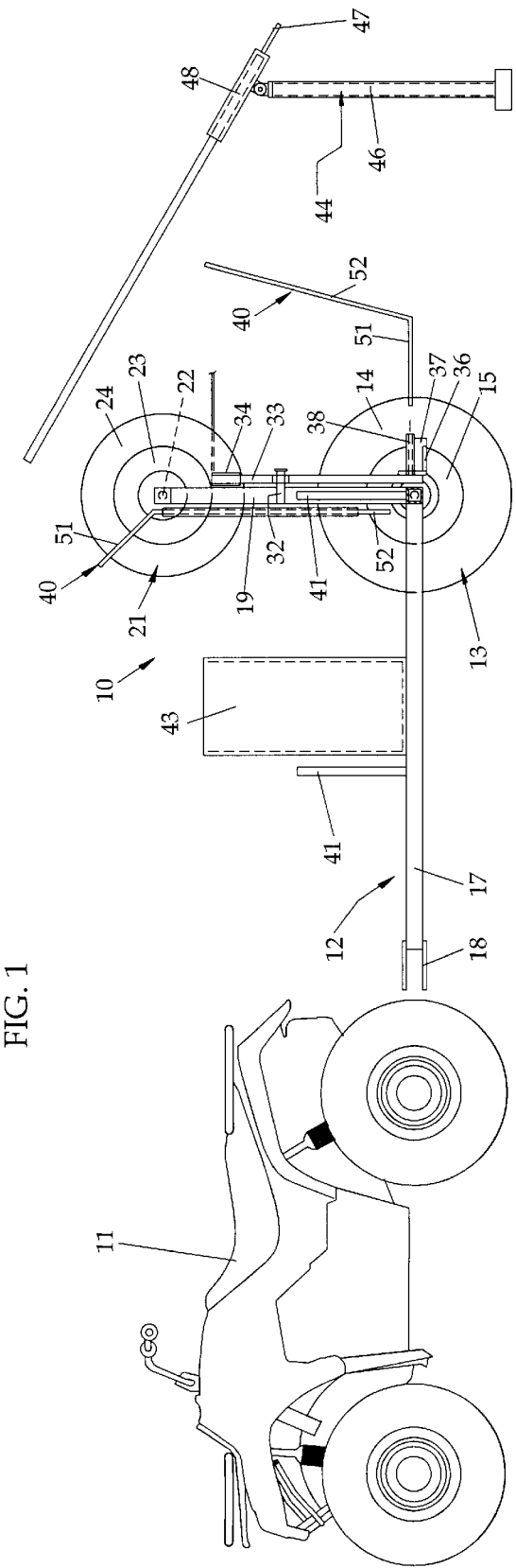
Figure 2:
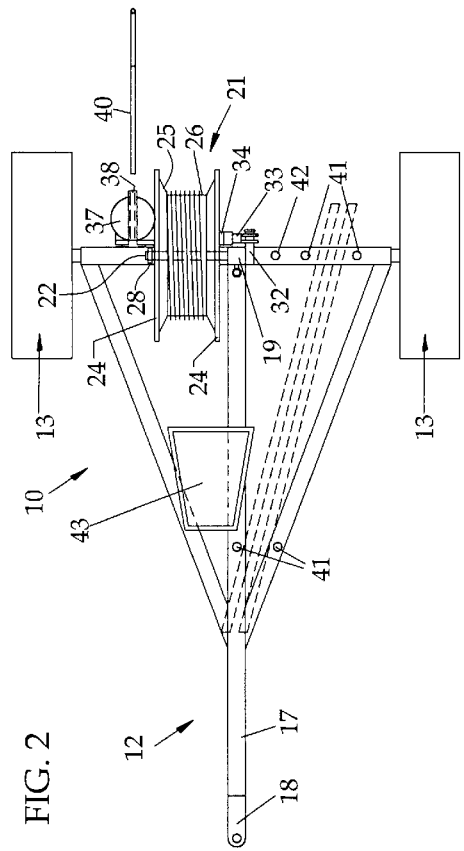
FIG. 2 is a plan view of the apparatus.

Referring to the drawings for a clearer understanding of the invention, it may be seen in FIG. 1 that the apparatus 10 is intended for use with a vehicle, such as the all terrain vehicle (ATV) 11 shown. It will be appreciated that a truck or tractor may be substituted as needed by the farmer. As may be seen in FIGS. 1, 4, and 5, the apparatus includes a carriage 12 which is shown as an open frame carriage but may be a mesh deck carriage or solid deck carriage. The carriage is conventionally supported on a pair of wheels 13, which may be mounted on a common axle or on stub axles as may be convenient. Likewise, the wheels may be of any convenient nature, either balloon tires 14 on hubs 15 or other variations. A forwardly extending tongue 17 is used to connect the carriage 12 to the vehicle 11 with either a pin and clevis connection 18 as shown or a ball and cap connector as is well known.

Along the centerline of the carriage a vertical stanchion 19 is affixed to the carriage and appropriately braced to support a spool 21 on a horizontally extending cantilevered spindle 22. Spool 21 is freely rotatable and either has sufficient mass on its own or has a supplemental inertial weight in the form of a disc 23 provided such that the spool 21 tends to remain motionless or rotating until acted on to overcome the inertial effect. For the purposes of this application the spool 21 has a wide groove 25 formed by annular sidewalls 24 which converge to a flat groove bottom 26 such that large quantities of polycoated electrical fence wire may be wrapped around the spool in the groove. A keeper 28, such as a pin or collar, is affixed to spindle 22 distal stanchion 19 to retain the spool on the spindle. A handle 31 is provided at a point on the outside of the spool opposite the stanchion such that a farmer may rotate the spool by grasping the handle and applying force.

Figure 4:
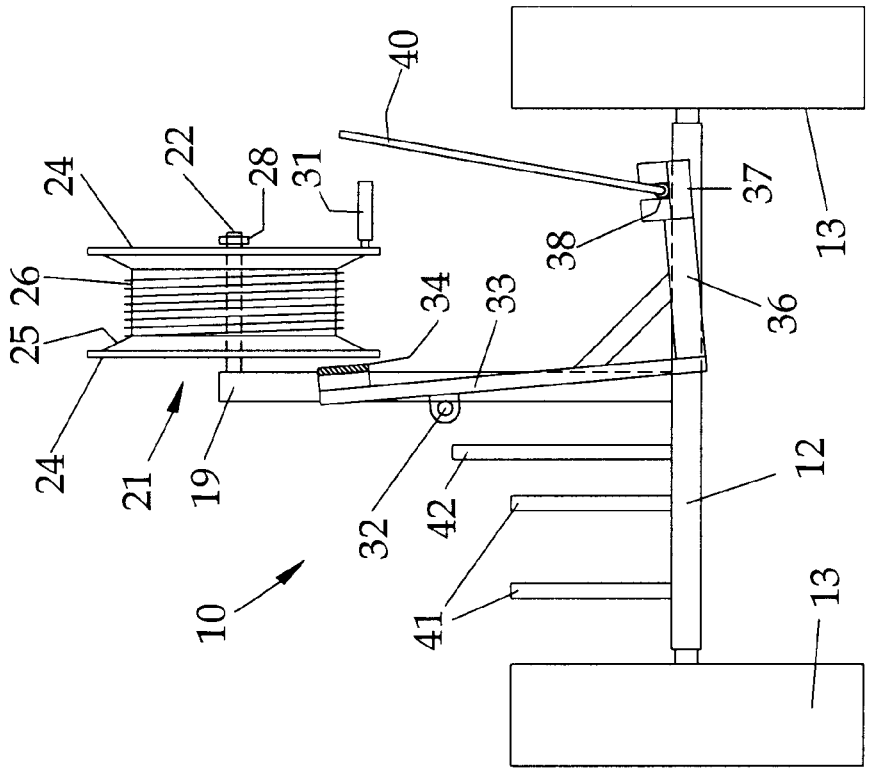
FIG. 4 is a rear elevation view of the apparatus with the brake disengaged.
Figure 3:
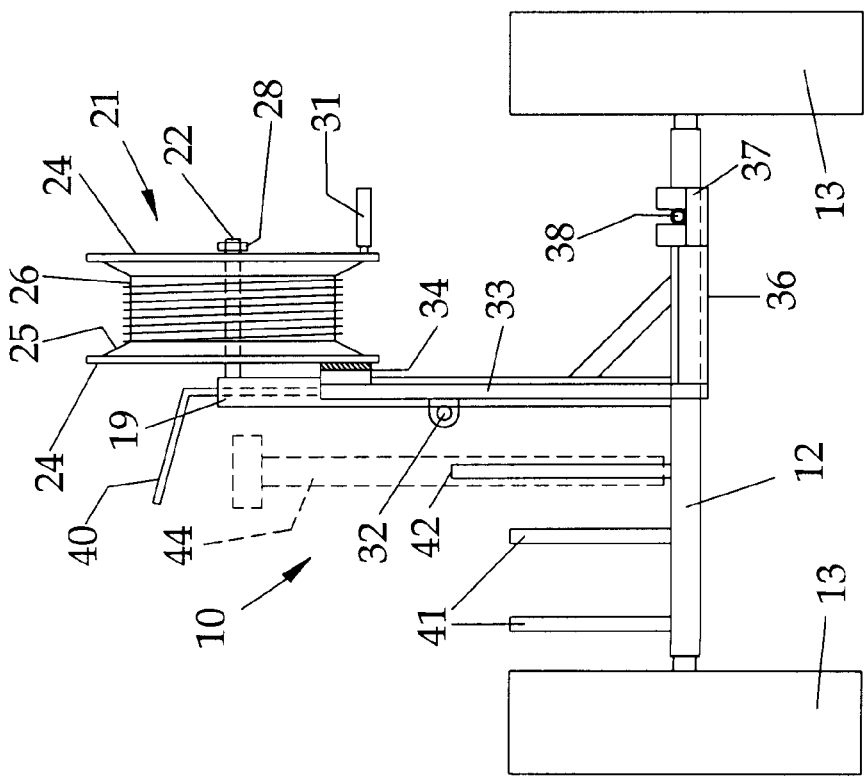
FIG. 3 is a rear elevation view of the apparatus.
Figure 6:
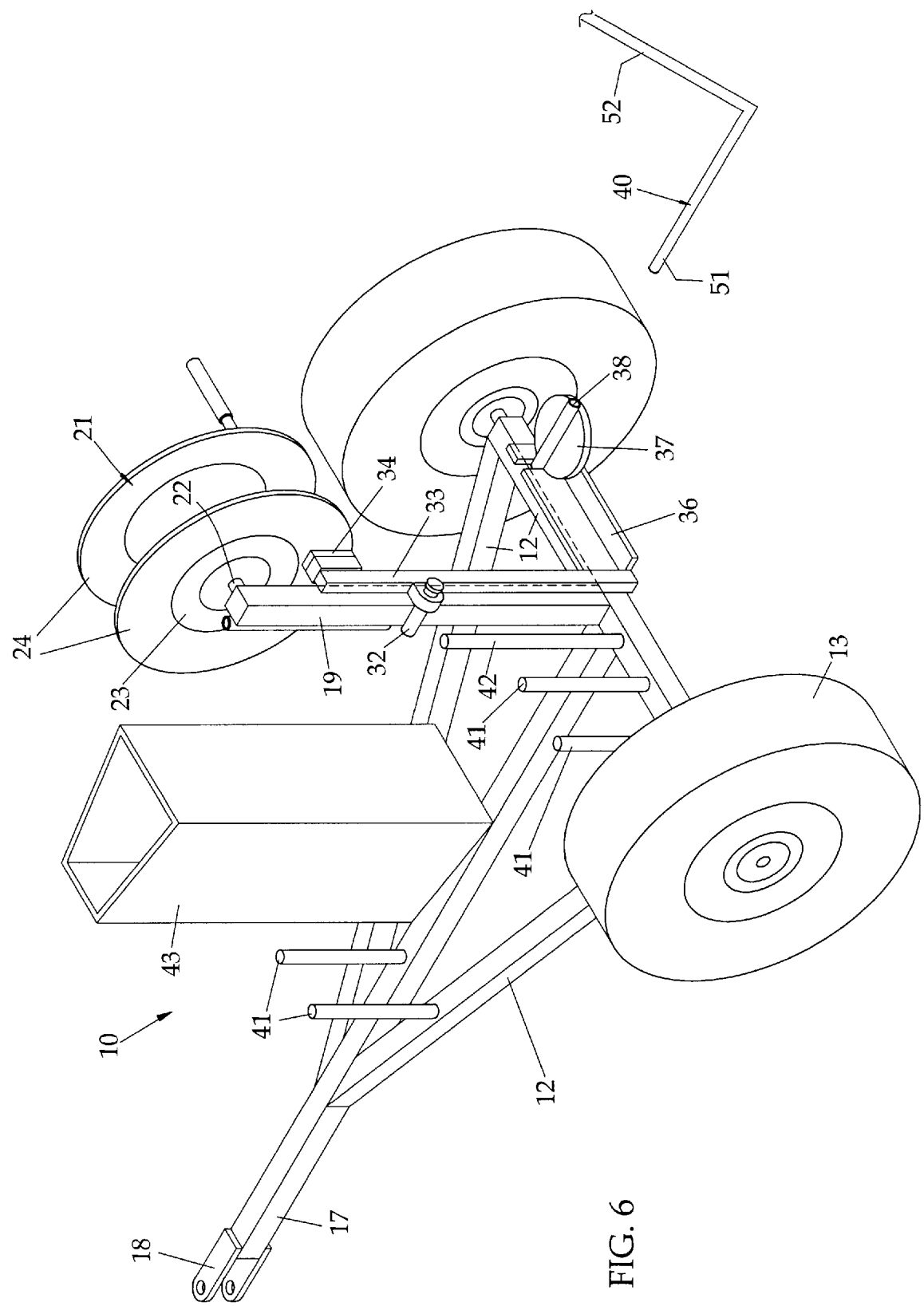
FIG. 6 is a perspective view of the apparatus.
Figure 7:
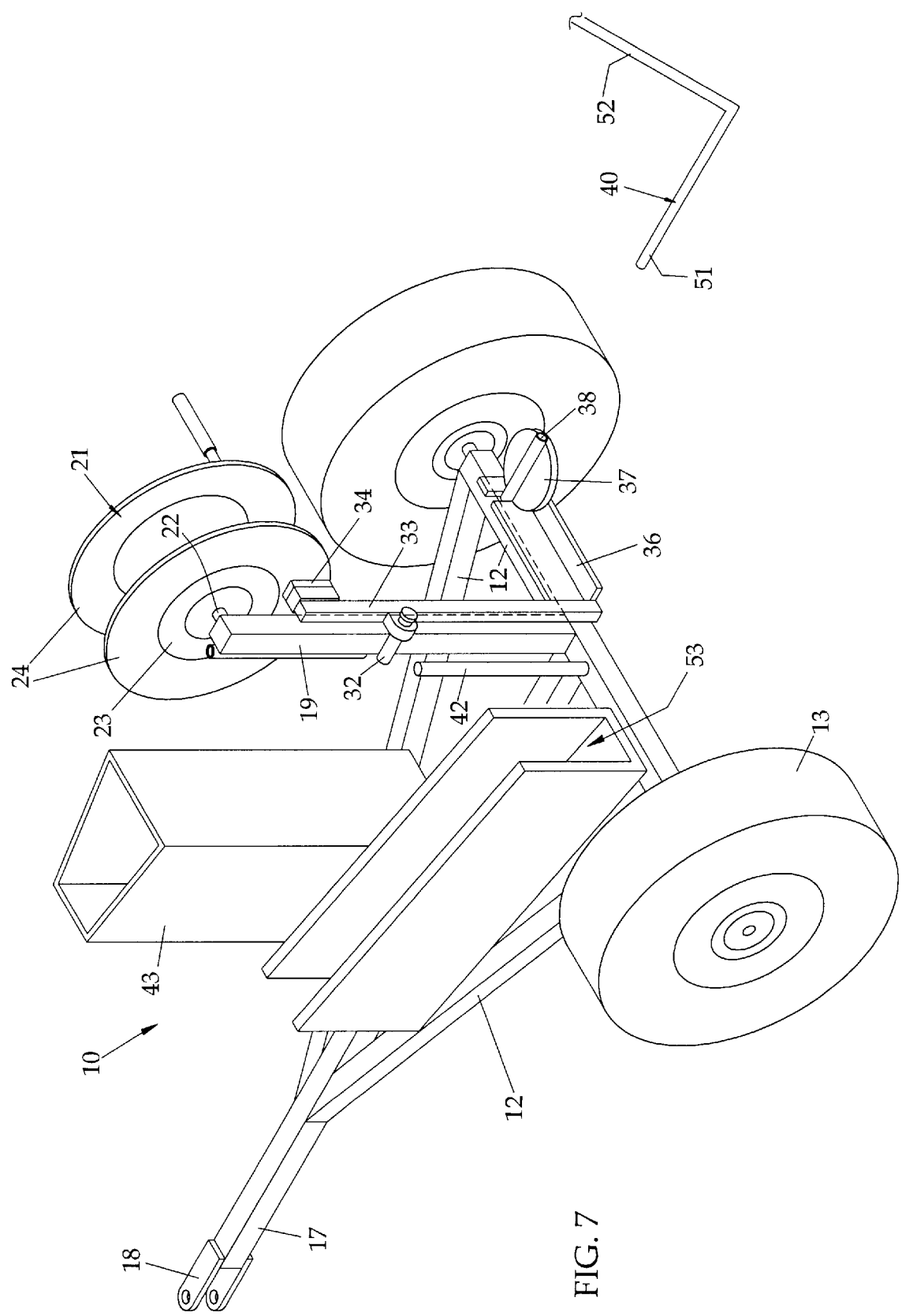
FIG. 7 is a perspective view of the apparatus.

Pivotally mounted to stanchion 19 by a mounting pin 32 is a pivot post 33 which has a brake pad 34 affixed at its upper end. Brake pad 34 is designed to engage spool 21 and retard the rotation of spool 21. Affixed at the lower end of stanchion 19 is a laterally extending member 36 with a weight 37 positioned thereon, such that the force of gravity urges pivot post 33 about its pivot at mounting pin 32 thereby bringing brake pad 34 into abutment against spool 21. Also affixed to member 36 is a receptacle 38 for a member 40 which can be used to support the weight at a position with the brake pad 34 disengaged from the spool 21 as shown in FIG. 4, which permits the spool to be freely rotated during retrieval of the wire.

Carriage 12 also supports an upwardly opening box-like structure 43 which has a bottom and sidewalls of sufficient height that supplemental fence posts may be retained therewithin while the carriage is in motion. It should be understood that electric fencing does not require full height fence posts at each increment along the wire. Rather, primary fence posts of approximately six feet in height are used with the wire supported typically within two feet of the ground. Intermediate the primary posts, shorter supplemental posts with wire engaging members near their top are used. While the spacing of posts is a matter of preference as to the amount of sag which can be tolerated for particular boundaries, it is anticipated that the supplemental posts can be separated by thirty to seventy-five feet with the primary posts needed only every several hundred feet and at corners where additional support may be needed. Carriage 12 also has a plurality of upright members forming a rack or channel within which a plurality of primary posts may be horizontally disposed for transport. The upright members are shown as posts 41; however, it is to be understood that an upwardly opening channel 53 utilizing appropriate plate-like members may be employed.

An additional post 42 is shown, which provides a carrying place for fulcrum tool 44, which is a length of pipe 46 having a clamping mechanism 47 and a sleeve 48 pivotally attached to the upper end such that the clamping mechanism can be brought into engagement with a post member which had been previously set in a fence and a lever inserted into sleeve 48. The lever may then be used to obtain a significant mechanical advantage in extracting the post from the ground. The lever may either be a spare primary post or member 40. Member 40 is stored in a receptacle formed on stanchion 19 and has a shorter portion 51 and a longer portion 52 integrally formed at an angle such that when shorter portion 51 is inserted through receptacle 38 the longer portion 52 extends upwardly to a height above spool 21. Portion 51 rests on carriage 12 and supports the brake pad assembly in a disengaged mode, thus, freeing spool 21 for wire retrieval.

In operation, to string an electric fence using the invention a farmer would set a primary post and connect the electric fence wire to it in a conventional manner. Then the first side of the boundary to be established would be determined by driving the ATV with the carriage attached along the boundary. At a selected distance, the ATV would be stopped to place a supplemental post. During the travel from one post to the next post position, the fence wire would play off the spool against the drag provided by the brake pad 34. When the ATV stops, the brake pad arrests the rotation of spool 21 maintaining adequate tension in the fence wire. The process of moving and placing supplemental and primary posts along the boundary is repeated as often as necessary to complete an enclosure, whereupon the wire is appropriately connected to a power source.

To move, or retrieve the fence, the wire is disconnected from all posts which are removed from the ground using fulcrum tool 44 as needed, and the carriage is positioned at a free end of the wire. The wire is joined to any wire already on spool 21 or attached to spool 21 within groove 25. Member 40 is inserted through receptacle 38 and brake pad 34 is urged away from spool 21. Portion 52 is grasped by the farmer, who can use one hand to grasp handle 31 and to rotate spool 21. Due to the inertial loading of the spool and the lightweight wire used the farmer need not continuously grip handle 31 but rather can use it intermittently to start rotation and increase the speed of rotation as the spool slows. As the spool rotates, the wire is wound thereon. To insure smooth and level winding the farmer can move portion 52 of member 40 transversely relative to the moving wire to position the wire laterally in groove 25. To reset the fence the original procedure is followed.

While I have shown my invention in one form, it is to be understood that the forgoing description is by way of illustration rather than limitation and the scope of the invention which I claim exclusive rights in is set forth in the appended claims:

What I claim is:

1. Apparatus for stringing and retrieving fencing comprising, in combination:
    a. a carriage including a pair of laterally disposed wheels and a forwardly extending tongue for attachment to a vehicle;
    b. a spool having a length of lightweight electrical fencing wire entrained thereon and supported by said carriage for rotation about a horizontal axis;
    c. a gravity actuated brake normally engageable with said spool to prevent over spooling when said fencing wire is removed;
    d. means for disengaging said brake and guiding said wire into said spool when said wire is retrieved;
    e. a hand grip affixed to said spool by which said spool can be rotated about said horizontal axis; and
    f. means mounted on said carriage for carrying a plurality of fence posts.

2. The apparatus as defined in claim 1 wherein said spool is mounted on a vertical support having a horizontally disposed spindle thereon for rotatably receiving said spool.

3. The apparatus as defined in claim 2 wherein said gravity actuated brake comprises a brake pad supported on a pivot post mounted for rotation about a horizontal axis toward and away from said spool, said pivot post having a weighted member affixed to the lower end thereof in offset relation such that said brake pad is gravitationally urged against said spool.

4. The apparatus as defined in claim 1 wherein said gravity actuated brake comprises a brake pad supported on a pivot post mounted for rotation about a horizontal axis toward and away from said spool, said pivot post having a weighted member affixed to the lower end thereof in offset relation such that said brake pad is gravitationally urged against said spool.

5. The apparatus as defined in claim 4 wherein said spool includes an inertial mass member.

6. The apparatus as defined in claim 4 wherein said weighed member comprises a laterally extending portion having a weight disposed distal said pivot post substantially beneath said spool.

7. Apparatus for stringing and retrieving fencing comprising, in combination:
    a. a carriage including a pair of laterally disposed wheels and a forwardly extending tongue for attachment to a vehicle;
    b. a spool having a length of electrical fencing wire entrained thereon and supported by said carriage for rotation about a horizontal axis;
    c. a gravity actuated brake normally engageable with said spool to prevent over spooling when said fencing wire is removed; said gravity actuated brakes comprising a brake pad supported on a pivot post mounted for rotation about a horizontal axis toward and away from said spool, said pivot post having a weighted member affixed to the lower end thereof in offset relation such that said brake pad is gravitationally urged against said spool; said weighted member comprising a laterally extending portion having a weight disposed distal said pivot post substantially beneath said spool;
    d. means for disengaging said brake and guiding said wire into said spool when said wire is retrieved; said laterally extending portion of said weighted member of said pivot post including a receptacle for engagement with said disengaging means;
    e. a hand grip affixed to said spool by which said spool can be rotated about said horizontal axis; and
    f. means mounted on said carriage for carrying a plurality of fence posts.

8. The apparatus as defmed in claim 7 wherein said disengaging means comprises an elongated member having a first portion off set from a second portion such that said first portion may be rotatably engaged through said receptacle to lift said weight to a position at which an end of said portion may rest on said carriage with said brake pad disengaged from said carriage, said second portion extending upwardly and being movable in an arc transversely of said wire when said wire is pulled tangentially from said spool.

9. Apparatus for stringing and retrieving fencing comprising, in combination:
    a. a carriage including a pair of laterally disposed wheels and a forwardly extending tongue for attachment to a vehicle;
    b. a spool having a length of electrical fencing wire entrained thereon and supported by said carriage for rotation about a horizontal axis;
    c. a gravity actuated brake normally engageable with said spool to prevent over spooling when said fencing wire is removed;
    d. means for disengaging said brake and guiding said wire into said spool when said wire is retrieved; said disengaging means comprising an elongated member having a first portion offset from a second portion such that said first portion may be rotatably engaged with said gravity actuated brake at a position at which an end of said portion may rest on said carriage with said brake disengaged from said carriage, said second portion extending upwardly and being movable in an arc transversely of said wire when said wire is pulled tangentially from said spool;
    e. a hand grip affixed to said spool by which said spool can be rotated about said horizontal axis; and
    f. means mounted on said carriage for carrying a plurality of fence posts.

10. Apparatus for stringing and retrieving fencing comprising, in combination:
    a. a carriage including a pair of laterally disposed wheels and a forwardly extending tongue for attachment to a vehicle; said carriage comprising a generally horizontally disposed frame supported on said wheels and a retainer for a fence post puller;
    b. a spool having a length of electrical fencing wire entrained thereon and supported by said carriage for rotation about a horizontal axis;
    c. a gravity actuated brake normally engageable with said spool to prevent over spooling when said fencing wire is removed;
    d. means for disengaging said brake and guiding said wire into said spool when said wire is retrieved and a receptacle for storing said disengaging means while said wire is being strung from said spool;

e. a hand grip affixed to said spool by which said spool can be rotated about said horizontal axis; and f. means mounted on said carriage for carrying a plurality of fence posts.

11. The apparatus as defined in claim 10 wherein said means for retaining fence posts comprises a plurality of spaced apart upright members extending above said frame for receiving said fence posts therebetween with said posts lying on said carriage.

12. The apparatus as defined in claim 11 wherein said upright members are posts.

13. The apparatus in claim 11 wherein said upright members are plates that define a channel for receiving said fence posts.

14. Apparatus for stringing and retrieving fencing comprising, in combination:

a. a carriage including a pair of laterally disposed wheels and a forwardly extending tongue for attachment to a vehicle;

b. a spool having a length of electrical fencing wire entrained thereon and supported by said carriage for rotation about a horizontal axis;

c. a gravity actuated brake normally engageable with said spool to prevent over spooling when said fencing wire is removed;

d. means for disengaging said brake and guiding said wire into said spool when said wire is retrieved;

e. a hand grip affixed to said spool by which said spool can be rotated about said horizontal axis; and f. means mounted on said carriage for carrying a plurality of fence posts; said means for retaining fence posts comprising a plurality of spaced apart upright members extending above said frame for receiving said fence posts therebetween with said posts lying on said carriage.

15. Apparatus for stringing and retrieving fencing comprising, in combination:

a. a carriage including a pair of laterally disposed wheels and a forwardly extending tongue for attachment to a vehicle;

b. a spool having a length of electrical fencing wire entrained thereon and supported by said carriage for rotation about a horizontal axis;

c. a gravity actuated brake normally engageable with said spool to prevent over spooling when said fencing wire is removed;

d. means for disengaging said brake and guiding said wire into said spool when said wire is retrieved;

e. a hand grip affixed to said spool by which said spool can be rotated about said horizontal axis; and f. means mounted on said carriage for carrying a plurality of fence posts; and g. a storage unit located on said carriage and a fulcrum defining jack detachably affixed to said storage unit, said jack being adapted for engaging and removing fence posts from the ground.

\* \* \* \* \*